United States Patent
Simonsson et al.

(10) Patent No.: US 9,615,265 B2
(45) Date of Patent: Apr. 4, 2017

(54) NETWORK NODE AND METHOD FOR ADJUSTING ANTENNA PARAMETERS IN A WIRELESS COMMUNICATIONS SYSTEM

(71) Applicant: TELEFONAKTIEBOLAGET L M ERICSSON (PUBL), Stockholm (SE)

(72) Inventors: Arne Simonsson, Gammelstad (SE); Martin Johansson, Mölndal (SE); Magnus Lundevall, Sollentuna (SE); Sven Petersson, Sävedalen (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/033,499

(22) PCT Filed: Nov. 7, 2013

(86) PCT No.: PCT/SE2013/051311
§ 371 (c)(1),
(2) Date: Apr. 29, 2016

(87) PCT Pub. No.: WO2015/069159
PCT Pub. Date: May 14, 2015

(65) Prior Publication Data
US 2016/0286407 A1    Sep. 29, 2016

(51) Int. Cl.
*H04W 16/28* (2009.01)
*H01Q 1/24* (2006.01)
(Continued)

(52) U.S. Cl.
CPC .......... *H04W 16/28* (2013.01); *H01Q 1/246* (2013.01); *H04L 43/16* (2013.01); *H04W 24/08* (2013.01); *H04W 72/085* (2013.01)

(58) Field of Classification Search
CPC .... H04W 16/28; H04W 24/08; H04W 72/085
See application file for complete search history.

(56) References Cited

U.S. PATENT DOCUMENTS

2003/0048760 A1   3/2003   Park et al.
2003/0153316 A1   8/2003   Noll et al.
(Continued)

FOREIGN PATENT DOCUMENTS

DE     19851701 A1    5/2000
EP      1492370 A2   12/2004
(Continued)

OTHER PUBLICATIONS

Antenna Based Self Optimizing, Reverb Intelligent SON Solutions, Reverb Networks, pp. 1-16, Jan. 2012.

*Primary Examiner* — Tuan Pham

(57) ABSTRACT

A network node and a method performed by a network node for adjusting antenna parameters of one or more antennas in a wireless telecommunications network is provided. First, the network node obtains signal strength values associated with the antennas for a number of user equipments in the wireless telecommunications network. Then, the network node determines an amount of user equipments of the number of user equipments having a signal strength value difference from two antennas that passes a determined threshold for the signal strength value difference, and adjusts at least one antenna parameter of at least one of the two antennas when the determined amount of user equipments passes a determined threshold for the amount of user equipments.

22 Claims, 7 Drawing Sheets

(51) Int. Cl.
*H04L 12/26* (2006.01)
*H04W 24/08* (2009.01)
*H04W 72/08* (2009.01)

(56) References Cited

U.S. PATENT DOCUMENTS

| | | | | |
|---|---|---|---|---|
| 2009/0104909 A1* | 4/2009 | Vesely | ................ | H04W 36/245 |
| | | | | 455/436 |
| 2009/0170510 A1* | 7/2009 | Kim | ..................... | H04W 36/30 |
| | | | | 455/434 |
| 2009/0274123 A1* | 11/2009 | Chang | ................... | H04W 24/10 |
| | | | | 370/332 |
| 2011/0212696 A1 | 9/2011 | Hahn et al. | | |
| 2013/0029669 A1 | 1/2013 | Boudreau et al. | | |

FOREIGN PATENT DOCUMENTS

| | | |
|---|---|---|
| GB | 2378858 A | 2/2003 |
| WO | 2012154097 A1 | 11/2012 |

* cited by examiner

NETWORK NODE AND METHOD FOR ADJUSTING ANTENNA PARAMETERS IN A WIRELESS COMMUNICATIONS SYSTEM

This application is a 371 of International Application No. PCT/SE2013/051311, filed Nov. 7, 2013, the disclosure of which is fully incorporated herein by reference.

TECHNICAL FIELD

Embodiments herein relate to antennas in a wireless telecommunications network. In particular, embodiments herein relate to a network node and a method adjusting antenna parameters in a wireless telecommunications network.

BACKGROUND

In a typical cellular network, also referred to as a wireless communication system, User equipment, UEs, communicate via a Radio Access Network, RAN, to one or more core networks, CNs.

A UE is a mobile terminal by which a subscriber may access services offered by an operator's core network and services outside operator's network to which the operator's RAN and CN provide access. The UE may be for example communication devices such as mobile telephones, cellular telephones, smart phones, tablet computers or laptops with wireless capability. The UE may be portable, pocket-storable, hand-held, computer-comprised, or vehicle-mounted mobile devices, enabled to communicate voice and/or data, via the radio access network, with another entity, such as another mobile station or a server. The UE may also be a Machine-to-Machine, M2M, communication device that serves as a data communication modem or is built into equipment communicating data with a server without human interaction. UEs are enabled to communicate wirelessly in the cellular network. The communication may be performed e.g. between two UEs, between a UE and a regular telephone and/or between the UE and a server via the RAN and possibly one or more CNs, comprised within the cellular network.

The RAN covers a geographical area which is divided into cell areas, with each cell area being served by a base station, e.g. a Radio Base Station, RBS, which in some RANs is also called eNodeB, eNB, NodeB, B node or network node. A cell is a geographical area where radio coverage is provided, via antennas, by the radio base station at a base station site. Each cell is identified by an identity within the local radio area, which is broadcast in the cell. The base stations communicate over the air interface operating on radio frequencies with the user equipment within range of the base stations. It should be noted that a base station may serve more than one cell, which may then also be referred to as a base station site.

A base station may also comprise so called adaptive or reconfigurable antennas. Adaptive antennas enable the base station to in flexible way configure the antennas in order to adapt to real UE spatial traffic distribution. For capturing the real UE spatial traffic distribution, the base station can measure signal strength, e.g. the Reference Signal Received Power, RSRP, and direction, e.g. Angle of Arrival, AoA, of user equipments transmissions. Also, the antenna beam can be adjusted to provide high antenna gain in order to better capture real UE spatial traffic distribution.

By adjusting parameters of the adaptive antennas to the real UE spatial traffic distribution, improved radio coverage can be achieved. Also, interference can be reduced by adjusting adaptive antenna parameters. Some examples of antenna parameters for which the adaptive antennas may be adjusted are antenna beam width and antenna pointing direction. For example, an antenna beam width can be formed so as to reduce the interference in the direction of a neighboring cell, wherein the direction of the interfered UEs can be measured by AoA on the uplink.

However, co-ordinating or optimizing antenna configurations in large wireless communications networks having many interfering cell or antenna relations and high density UE spatial traffic distributions is a multi-dimensional task that is highly complex. For example, it is not uncommon with 20 or more neighboring cells or antennas of multiple network nodes that potentially need to be coordinated from interference point of view.

SUMMARY

It is an object of embodiments herein to simplify antenna configuration in a wireless communications network.

According to a first aspect of embodiments herein, the object is achieved by a method performed by a network node for adjusting antenna parameters of one or more antennas in a wireless telecommunications network. First, the network node obtains signal strength values associated with the antennas for a number of user equipments in the wireless telecommunications network. Then, the network node determines an amount of user equipments of the number of user equipments having a signal strength value difference from two antennas that passes a determined threshold for the signal strength value difference, and adjusts at least one antenna parameter of at least one of the two antennas when the determined amount of user equipments passes a determined threshold for the amount of user equipments.

According to a second aspect of embodiments herein, the object is achieved by a network for adjusting antenna parameters of one or more antennas in a wireless telecommunications network. The network node comprises processing circuitry configured to obtain signal strength values associated with the antennas for a number of user equipments in the wireless telecommunications network. The processing circuitry is further configured to determine an amount of user equipments of the number of user equipments having a signal strength value difference from two antennas that passes a determined threshold for the signal strength value difference, and adjust at least one antenna parameter of at least one of the two antennas when the determined amount of user equipments passes a determined threshold for the amount of user equipments.

By collecting measurements from user equipments for an antenna and determining the distribution of the user equipments in terms of their signal strength value difference towards other neighboring antennas, antenna relations having a high amount of user equipments with low signal strength value differences, i.e. low cell isolation, may be identified. This indicates an unnecessary large degree of overlap in radio coverage between the antennas in such a cell or antenna relation. Thus, at least one antenna parameter of at least one antenna in at least one antenna relationship that has a high amount of user equipments with low isolation is adjusted. This provides a self-organizing antenna adjustment or tuning that reduces interference in the cells of the wireless communications network, and thus causes an increased capacity and achievable data rates in the cells of the wireless communications network.

Hence, having this self-organizing antenna adjustment or tuning of antennas in the network nodes significantly increases the simplicity of antenna configuration in the wireless communications system.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
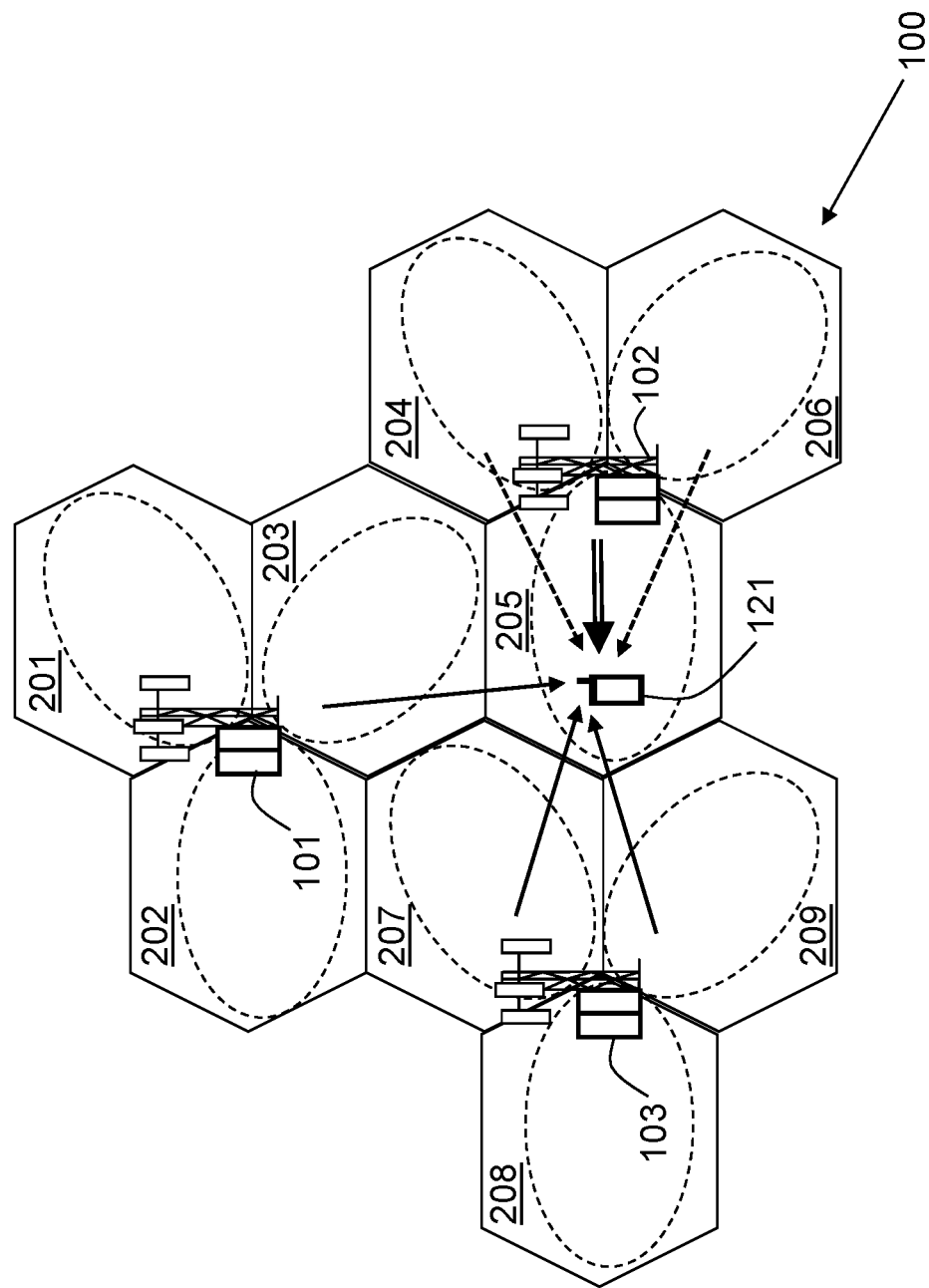
FIG. 1 is a schematic block diagram illustrating cells and network nodes in a wireless communications network.

The figures are schematic and simplified for clarity, and they merely show details which are essential to the understanding of the embodiments presented herein, while other details have been left out. Throughout, the same reference numerals are used for identical or corresponding parts or steps. It may also be noted that the expression "user equipment" (UE) includes, but is not limited to, a mobile terminal, a mobile phone, a personal digital assistant, a mobile station, a portable computer equipped with suitable transceivers, a stationary computer equipped with suitable transceivers and the like.

In the following, according to embodiments herein which relate to adjusting antenna parameters in a wireless telecommunications network, there will be disclosed a self-organizing antenna adjustment or tuning of antenna configurations in a network node.

FIG. 1 show example of a telecommunication system 100 in which embodiments herein may be implemented. The cellular communications system 100 is a wireless communication network such as an LTE, WCDMA, GSM network, any 3GPP cellular network, or any cellular network or system such as a WLAN or WiFi network.

The wireless communications system 100 comprises network nodes 101, 102, 103. The network nodes 101, 102, 103 may be connected and configured to communicate with each other over, for example, an X2 connection. In this example, the network node 101 is configured to provide wireless radio coverage to user equipments in cells 201, 202, 203, while the network node 102 is configured to provide wireless radio coverage to user equipments in cells 204, 205, 206. The network node 103 is configured to provide wireless radio coverage to user equipments in cells 207, 208, 209. The network nodes 101, 102, 103 each comprise one or more antennas for wireless radio communication with user equipments located within their coverage range. The network nodes 101, 102, 103 may use one or more of these antennas to provide radio coverage in each of its cells. However, for the sake of simplicity, it is in the following assumed that the network node 101, 102, 103 uses one antenna per cell. However, it should be noted that when adjusting antenna parameter for at least one antenna in the following, this may also mean adjusting a set of antennas serving the same cell.

In this example, a user equipment 121 is located in cell 205 being served by the network node 102.

FIG. 1 illustrates an example of a downlink transmission scenario wherein the user equipment 121 may receive reference or pilot signals (depicted by the double arrow) from the antenna serving the cell 205 of the network node 102, i.e. the connected cell of the user equipment 121.

In this example, the user equipment 121 may also receive reference or pilot signals from antennas serving neighboring cells. When these interfering antennas serving neighboring cells are not located at the network node 102, i.e. antennas serving the cells 203, 207, 209 of the network nodes 101, 103 (depicted by the fully drawn arrows), these reference or pilot signals may be referred to as inter-site reference or pilot signals. When the antennas are located at the network node 102, i.e. antennas serving the cells 204, 206 of the network node 102 (depicted by the dashed arrows), these reference or pilot signals may be referred to as intra-site reference or pilot signals.

This is because the cell coverage areas often overlaps between neighboring cells, e.g. the actual radio coverage areas of the antennas (depicted by the dashed lined areas) may often overlap (although not shown in FIG. 1) in a wireless communications network 100.

Although embodiments below are described with reference to the scenario of FIG. 1, this scenario should not be construed as limiting to the embodiments herein, but merely as an example made for illustrative purposes.

It should be noted that the embodiments described herein are applicable to any cellular communication standard wherein adaptive or reconfigurable antennas are used. As non-limiting examples, reference or pilot signal measurements and reporting are supported for GSM as RxLev, for WCDMA as the Received Signal Code Power (RSCP), for LTE as Reference Signal Received Power (RSRP), and for WLAN as the beacon signal strength.

Figure 2:
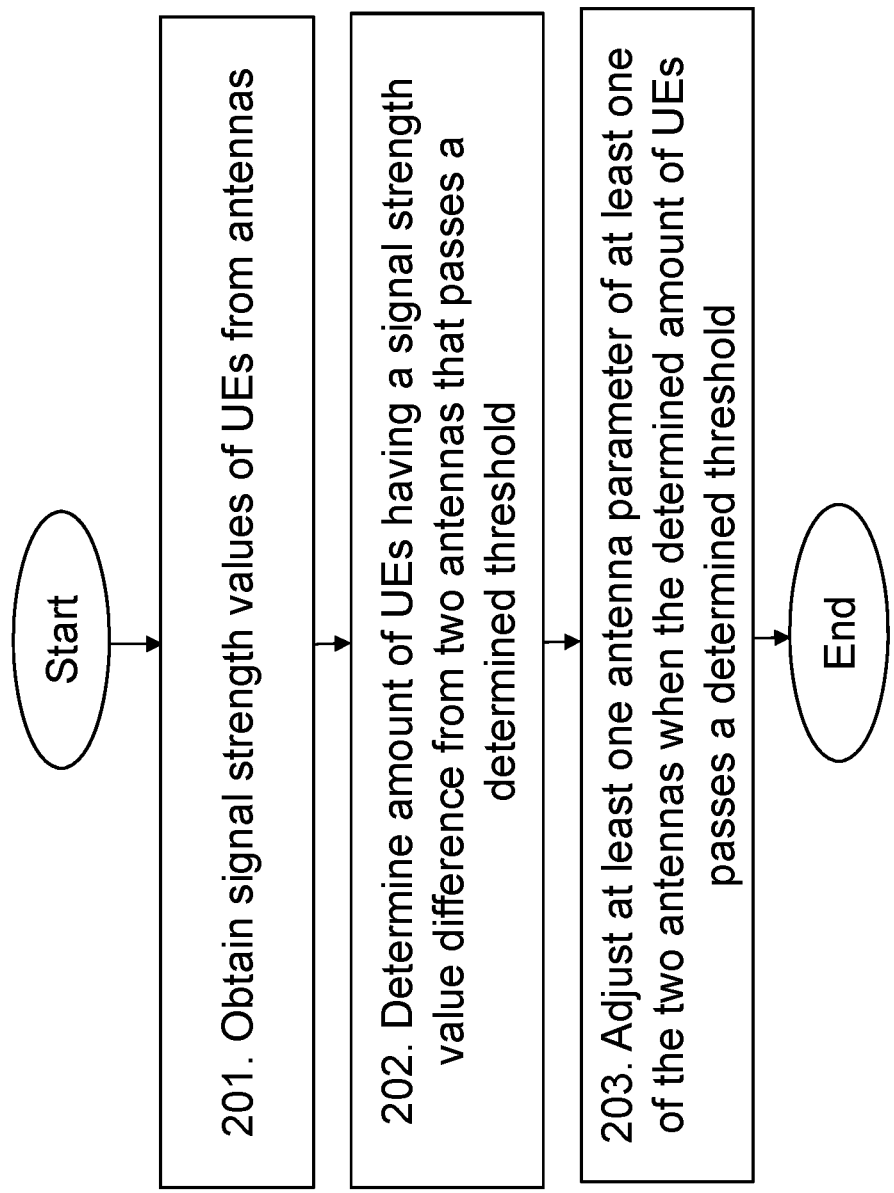
FIG. 2 is a flowchart depicting embodiments of a method in a network node.

Example of embodiments of a method performed by the network node 102 for adjusting antenna parameters of one or more antennas in a wireless telecommunications network 100, will now be described with reference to the flowchart depicted in FIG. 2. FIG. 2 is an illustrated example of actions or operations which may be taken by the any one of the network nodes 101, 102, 103.

However, it should also be noted that these actions or operations may also be performed by a centralized node in the wireless communications network 100, such as, e.g. a core network node, a radio network controller, a Radio Resource Management, RRM, server, an Operations Support System, OSS, node or the like. The centralized node may also be e.g. an eNB controlling distributed Remote Radio Units, RRUs, via e.g. a Common Public Radio Interface, CPRI, or an eNB controlling radio heads over an active Distributed Antenna System, DAS, network. The method may comprise the following actions.

Action 201

In this action, the network node 102 obtains signal strength values of user equipments from antennas. In other words, the network node 102 obtains signal strength values associated with antennas for a number of user equipments 121 in the wireless telecommunications network 100.

In some embodiments, the signal strength values may be obtained by the network node 102 from user equipments served by the cell 205 of the network node 102. For example, this means that if implemented by all network nodes 101, 102, 103 in FIG. 1, signal strength values are obtained for all user equipments connected to each cell towards all detected neighboring cells of that cell. This will enable the identification, described in the following action 202, of the strongest interfering neighbours for all cells for the actual spatial distribution of user equipments in the wireless communications network 100.

With reference to the downlink transmission scenario illustrated in FIG. 1, the signal strength values may be obtained e.g. in that the signal strength of the reference or pilot signals received by the user equipment 121 from its connected cell antenna and from neighboring cell's antennas are measured by the user equipment 121 and then reported to the network node 102, i.e. the network node of the connected cell. This may be performed by all user equipments in the cell 205 being served by the network node 102.

The signal strength values may also be obtained e.g. in that the network nodes 101, 102, 103 measures the signal strength of the reference or pilot signals that is received from all user equipments in the wireless telecommunications network 100. This means that corresponding downlink signal strength values for each user equipment from each antenna may be determined from known transmission power levels, i.e. uplink transmission power levels from the user equipments and downlink transmission power levels from each antenna. The downlink signal strength value difference may in fact be calculated without knowledge of the user equipments transmission power levels if measured at the same time in all antennas. The signal strength values may here be exchanged between the network nodes 101, 102, 103, e.g. by X2 signalling.

The signal strength values associated with antennas that are obtained for all user equipments may be gathered for a time period that is long enough to capture or measure the spatial distribution of the user equipment traffic for which the antennas are to be adjusted. For example, the time period may be a shorter period of time, such as, e.g. one (1) hour, in order to follow variations in the spatial distribution of user equipments, or a longer period of time, such as, e.g. up to a week (7 days) in order to adapt to the average weekly spatial distribution of user equipments. It should be noted that these examples are non-limiting, and that the time period may be set differently in different cells or areas in order to capture different types of spatial distributions of user equipments.

In some embodiments, when e.g. implemented in an LTE communications network, the user equipment 121 may measure the Reference Signal Received Power, RSRP, for the connected cell i and the neighboring cells j (for j=1, . . . , N, wherein N is the number of neighboring cells). These are denoted in the following as $RSRP_i$ and $RSRP_j$, respectively. The user equipment 121 may then report or transmit these $RSRP_i$ and $RSRP_j$ values to the network node 102 through e.g. Radio Resource Control, RRC, signalling. This may also be performed in a similar manner for RxLev in embodiments implemented in GSM, for RSCP in embodiments implemented in WCDMA, and for beacon signal strength in embodiments implemented in WLAN. In some embodiments, when the signal strength values are obtained from network nodes in an LTE communications network, Sounding Reference Signals, SRS, may be measured and used in a similar manner as described below.

In some embodiments, the obtaining, or sampling, may be normalized in order to capture the traffic load. This may be performed by network node 102 or the user equipments 121, e.g. by reporting or logging signal strength values per connection second to normalize to active time, or Mbps to normalize to traffic volume load.

Alternatively, in some embodiments, the network node 102 may also normalize the signal strength values for antennas based on scheduled resource blocks or transmission times in order to capture the radio resource load. This may be performed because, with link adaptation, more robust modulation and coding will result in longer transmission times for a given packet size. Furthermore, in a Frequency Divided Multiple Access, FDMA, network, such as, e.g. an LTE communications network, this may be performed because more robust modulation and coding may also result in more scheduled resource blocks at each time instance instead of longer transmission time depending on scheduling principle.

Action 202

After obtaining the signal strength values, the network node 102 determines the amount, e.g. fraction, of user equipments having a signal strength value difference from two antennas that passes a determined threshold. In other words, the network node 102 determines an amount of user equipments of the number of user equipments having a signal strength value difference from two antennas that passes a determined threshold for the signal strength value difference. By determining the distribution of the user equipments in the cell 205 being served by the network node 102 in terms of the signal strength value differences, or a geometry factor as described below, an isolation measurement per neighbouring cell, or per neighboring antenna, for the cell 205 or the antenna of the cell 205, respectively, is achieved. This isolation measurement per cell or antenna relation enables the identification of the strongest interfering neighbours, in terms of antennas or cells, for the actual distribution of the user equipments.

In some embodiments, with reference to the downlink transmission scenario illustrated in FIG. 1, one antenna of the two antennas serves user equipments in a cell, e.g. cell 205, of the network node, e.g. network node 102, and the other antenna of the two antennas serves user equipments in a neighboring cell, e.g. cell 203, 204, 206, 207 or 209, of the same network node, i.e. network node 102, or another network node, e.g. network node 101 or 103, in the wireless telecommunications network 100.

This advantageously applies the adjustment of antenna parameters on a cell level and provides a self-organization antenna tuning between cells.

Further, the signal strength value difference between the antenna providing radio coverage in a cell of the network node, e.g. the cell 205 for the network node 102, and another antenna of a neighbouring cell, such as, e.g. cell 209 of network node 103, may be referred to as a geometry factor or geometry measurement for this cell or antenna relation. The signal strength value difference or geometry factor is a good measurement of the potential inference from the neighbouring cell or antenna on downlink transmissions from the network node 102 to the user equipments in the cell 205 that is independent of the actual load and data transmission activity at the network node 102. The geometry factor also captures the power setting and power planning in the wireless communications network 100.

Thus, in some embodiments, the geometry factor G may be determined for each neighbouring cell or antenna as the difference of the signal strength value in decibel, i.e. ratio of linear values, of the connected cell, e.g. the cell 205 or the antenna of the cell 205, and each of the neighbouring cells, e.g. the cell 203, 204, 206, 207, 209 or the antenna(s) of the cell 203, 204, 206, 207, 209, respectively.

In some embodiments, this may be performed by the network node 102 by calculating the geometry factor G for each reported or transmitted RSRP measurement from the user equipments according to Eq. 1:

$$G_{ij}=RSRP_i-RSRP_j \text{ [dB]} \quad \text{(Eq. 1)}$$

In some embodiments, in determining the distribution of the user equipments in terms of the geometry factor, the network node 102 may determine a cumulative distribution function, CDF, for each cell or antenna relation, i.e. for each detected neighbouring cell or antenna, such as, e.g. cell 209 for the cell 205, or the antenna of the cell 209 in the network node 103 for the antenna of the cell 205 in the network node 102. In some embodiments, for each cell relation {i, j}, a CDF $F_{ij}$ may be determined according to Eq. 2:

$$F_{ij}(x)=P(G_{ij} \geq x) \quad \text{(Eq. 2)}$$

This enables identification of low isolation cell or antenna relations, i.e. cell or antenna relations having a high amount of user equipments with low signal strength value differences. This low isolation between cells or antennas may indicate that there is an unnecessary large degree of overlap in radio coverage between the cells or antennas in such a cell or antenna relation causing an unnecessary high degree of interference.

In some embodiments, the cell or antenna relations with low cell/antenna isolation may be identified as having a low geometry factor G for a given percentile P, or as having a high percentile P for a given geometry factor G. Here, cell or antenna relations with high cell or antenna isolation may be identified by a high geometry factor G for a given percentile P.

In some embodiments, the thresholds may be determined based on the spatial traffic distribution of the user equipments and the planned network grid of the wireless communication network 100. For example, in case there is a lot of user equipment traffic situated on the edge between two cells or antenna coverage areas, the cell or antenna isolation may not be improved to the suitable level for a well-planned network and the low geometry factor may need to be set even lower. In some embodiments, the determined signal strength value difference threshold, i.e. the geometry factor G, is in the range of about 3-25 dB, and the determined threshold amount of user equipments, i.e. the percentile P, is in the range of about 5-60 percent of the number of user equipments. A further example of a suitable percentile P may be set within a range of 0.2-0.6 (i.e. 20-60% of the user equipments) and the low geometry factors G may be set within a range of 3-10 dB.

In some embodiments, the identification of low isolation cell or antenna relations may, e.g. be based on a determined threshold y for a fraction of low geometry values x. For example, the identification of a low isolation cell or antenna relation may be based on the condition according to Eq. 3:

$$P(G_{ij}<5dB)>0.5 \quad \text{(Eq. 3)}$$

wherein a low geometry value (e.g. 5 dB, i.e. x=5 dB) and a threshold (e.g. 50% of the user equipments, i.e. y=0.5) has been determined.

Thus, when the amount of user equipments that has a geometry value below 5 dB is larger than the determined threshold of 50% of the user equipments, i.e. fulfils the condition of Eq. 3, the network node 102 may trigger an adjustment of the one or more of the antennas in the cell or antenna relation {i, j}.

Action 203

In this action, the network node 102 adjusts at least one antenna parameter of at least one of the two antennas when the determined amount of user equipments passes a determined threshold for the amount of user equipments. This means that when a cell or antenna relation with low isolation has been identified in Action 202, the network node 102 may adjust or reconfigure the antenna in the cell and/or the antenna of the interfering cell. Thus, at least one antenna parameter may be adjusted for at least one of the two antennas.

In some embodiments, with reference to the downlink transmission scenario illustrated in FIG. 1, the network node 102 may adjust or reconfigure at least one antenna parameter of the antenna in the cell 205. In other words, the at least one antenna parameter is adjusted for the one antenna of the two antennas serving user equipments in the cell of the network node 102, e.g. the cell 205 of the network node 102. In some embodiments, when e.g. implemented in an LTE communications network, this means that the network node 102 may adjust or reconfigure at least one antenna parameter of the antenna for the connected cell i.

In some embodiments, the network node 102 may adjust or reconfigure at least one antenna parameter of the antenna of the interfering cell, e.g. the antenna of the cell 203, 204, 206, 207 or 209. In other words, the at least one antenna parameter is adjusted for the other antenna of the two antennas serves user equipments in a neighboring cell of the same or another network node. This may be performed by the network node 102 by sending an indication to the network node of the interfering antenna, e.g. to the network node 101 for the antenna of the cell 203 or to the network node 103 for the antenna of the cell 209. This may e.g. be performed by X2 signalling. In some embodiments, when e.g. implemented in an LTE communications network, this means that the network node 101, 103 may adjust or reconfigure at least one antenna parameter of the antenna for the neighboring cells j based on the indication from the network node 102.

In some embodiments, the at least one antenna parameter is adjusted for both of the two antennas jointly. In some embodiments, when e.g. implemented in an LTE communications network, this means that the network node 102 may adjust or reconfigure at least one antenna parameter of the antenna for both the connected cell i and, e.g. by indication to the network node 101, 103, the neighboring cell j.

In some embodiments, the at least one antenna parameter is one or more of: the tilt angle of the antenna, the beam width of the antenna, the direction of the antenna, and the null direction of the antenna. In other words, the at least one antenna parameter may be adjusted to increase or decrease the cell or antenna isolation between the two cells or antennas, to reduce the interference caused in the connected cell, and/or to improve the radio coverage between the two cells or antennas. It should be noted that the tilt angle of the antenna may be an electrical and/or mechanical tilt, the beam width of the antenna may be a vertical and/or horizontal beam width, and the direction of the antenna may be a vertical and/or horizontal direction.

In some embodiments, the at least one antenna parameter is adjusted by the network node 102 dependent upon whether the two antennas are positioned at different locations, e.g. at different network nodes, serving different neighboring cells, e.g. when the interfering antenna is located at one of the network nodes 101, 103 serving one of the neighboring cells 203, 207, 209, or whether the two antennas are positioned co-located, e.g. at the same network node 102, but serving different neighboring cells, e.g. when the interfering antenna is located at the network nodes 102 but serves one of the neighboring cells 204, 206.

In some embodiments, when the two antennas are positioned co-located serving different neighboring cells, e.g. when the interfering antenna is located at the network nodes 102 but serves one of the neighboring cells 204, 206, the at least one antenna parameter is one or more of: the beam width of the antenna, and the direction of the antenna. This means that if the interfering cell antenna is co-sited with the cell antenna in the network node 102, the adjustment may be performed by the network node 102 by narrowing the horizontal beam width or turning the horizontal antenna direction.

In some embodiments, when the two antennas are positioned at different locations serving different neighboring cells e.g. when the interfering antenna is located at one of the network nodes 101, 103 serving one of the neighboring cells 203, 207, 209, the at least one antenna parameter is one or more of: the tilt angle of the antenna, and the null direction of the antenna. This means that, if the interfering cell antenna is located at another site location, the adjustment may be performed by the network node 102 by increased tilt or reshaping the beam to reduce (null) the interference towards the interfering cell antenna. It should be noted that in this case, it may also be more beneficial for the network node 102 to adjust the at least one antenna parameter of the interfering antenna that is located at one of the network nodes, e.g. the network nodes 101, 103 serving one of the neighboring cells 203, 207, 209.

In some embodiments, the network node 102 may adjust the at least one antenna parameter by using of one or more additional measurements. The additional measurements may be one or more of: drop rate measurements of user equipments, and Reference Signal Received Power, RSRP, measurements. This means that the isolation measurement per cell or antenna relation may be combined with other known measurements, such as, e.g. radio coverage. While a low geometry factor distribution per neighbour indicates large cell or antenna overlap and good coverage between the two cells or antennas, there may be worse coverage in other directions, i.e. towards other neighbouring cells.

In some embodiments, the network node 102 may determine the antenna parameter that is to be adjusted based on signal strength value differences of the number of user equipments, i.e. which antenna parameter to adjust. For example, if the determined threshold for the amount of user equipments is passed for the signal strength difference between cells 205 and 204, but not for the signal strength difference between cells 205 and 206, then the network node 102 may adjust the horizontal direction of the antenna serving user equipments in cell 205 by turning the antenna in a direction towards the cell 206 and away from cell 204.

In another example, if the determined threshold for the amount of user equipments is passed for the signal strength difference for both cells 205 and 204 and cells 205 and 206, the network node 102 may adjust the antenna serving user equipments in cell 205 to comprise a narrower horizontal beam width. This comparative adjustment based on the amount of user equipments having a certain signal strength differences may reduce the overlap to both cells 204 and 206 for the cell 205.

In a further example, if the determined threshold for the amount of user equipments is passed for the signal strength difference between cells 205 and 204, the network node 102 may compare the excess amount of user equipments having a signal strength difference above the signal strength difference threshold between cell 205 and 204 with the amount of user equipments having a signal strength difference above the signal strength difference threshold between cell 205 and 206. If the difference between the amounts of user equipments is large, then the network node 102 may perform a large adjustment of the horizontal direction of the antenna serving user equipments in cell 205. If the difference between the amounts of user equipments is small, then the network node 102 may perform a small adjustment of the horizontal direction of the antenna serving user equipments in cell 205. This comparative adjustment based on the amount of user equipments having a certain signal strength differences may avoid creating a large overlap between cells 205 and 206.

Figure 3:
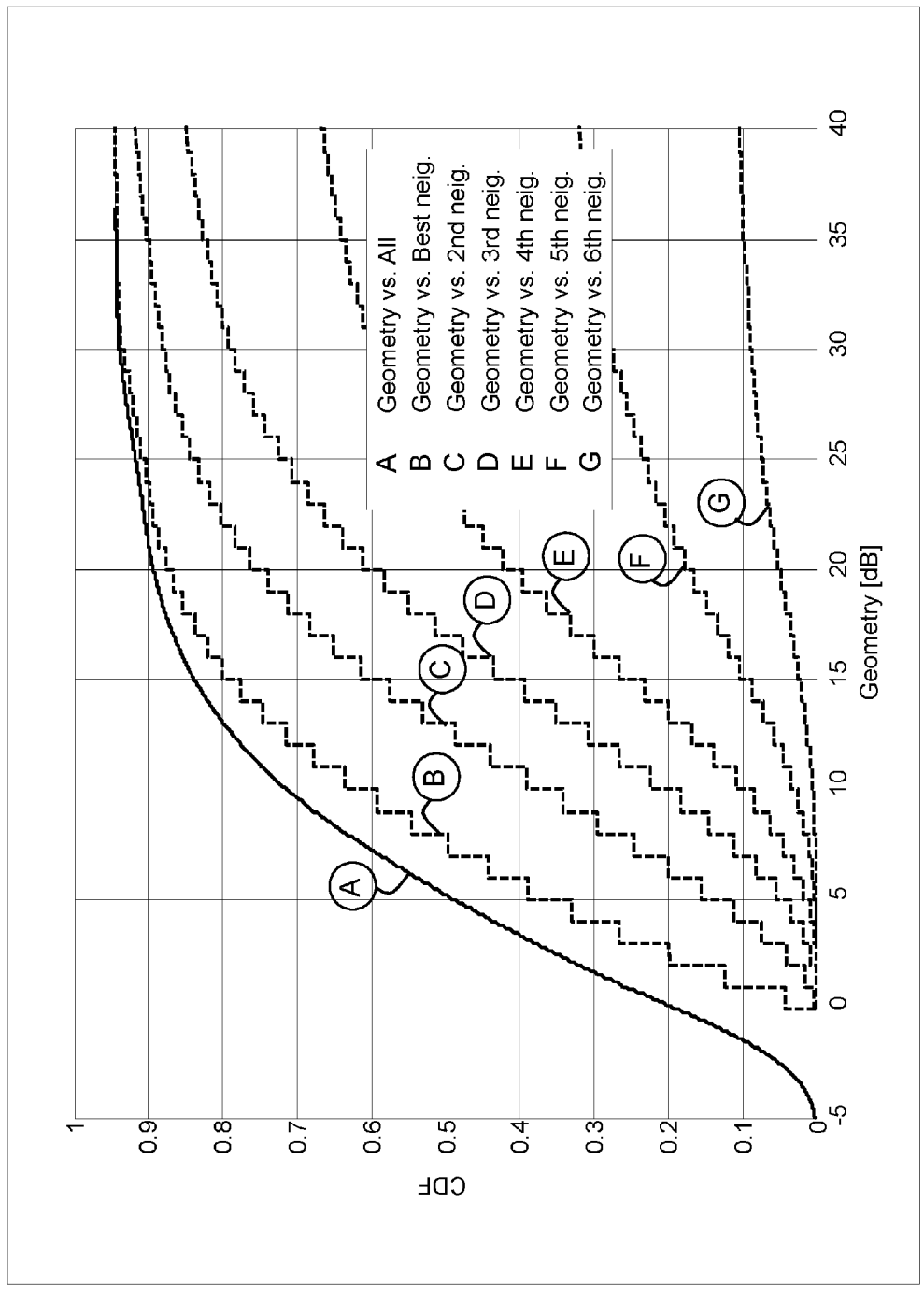
FIG. 3 is a diagram illustrating cumulative distribution functions for cell relations according to some embodiments.

FIG. 3 is a diagram illustrating examples of cumulative distribution functions, CDFs, for different cell relations in a well isolated wireless communications network 100.

For a cell of a network node, e.g. the cell 205 of network node 102, the dashed line B shows the distribution of user equipments for the strongest interfering neighboring cell which has the lowest cell isolation in respect to the cell of the network node. Furthermore, the dashed lines C-G shows the distribution of user equipments for the next strongest interfering neighboring cells in a descending order which have the next lowest cell isolations in respect to the cell of the network node, e.g. the cells 203, 204, 206, 207, 209 of the network nodes 101, 102, 103.

Figure 4:
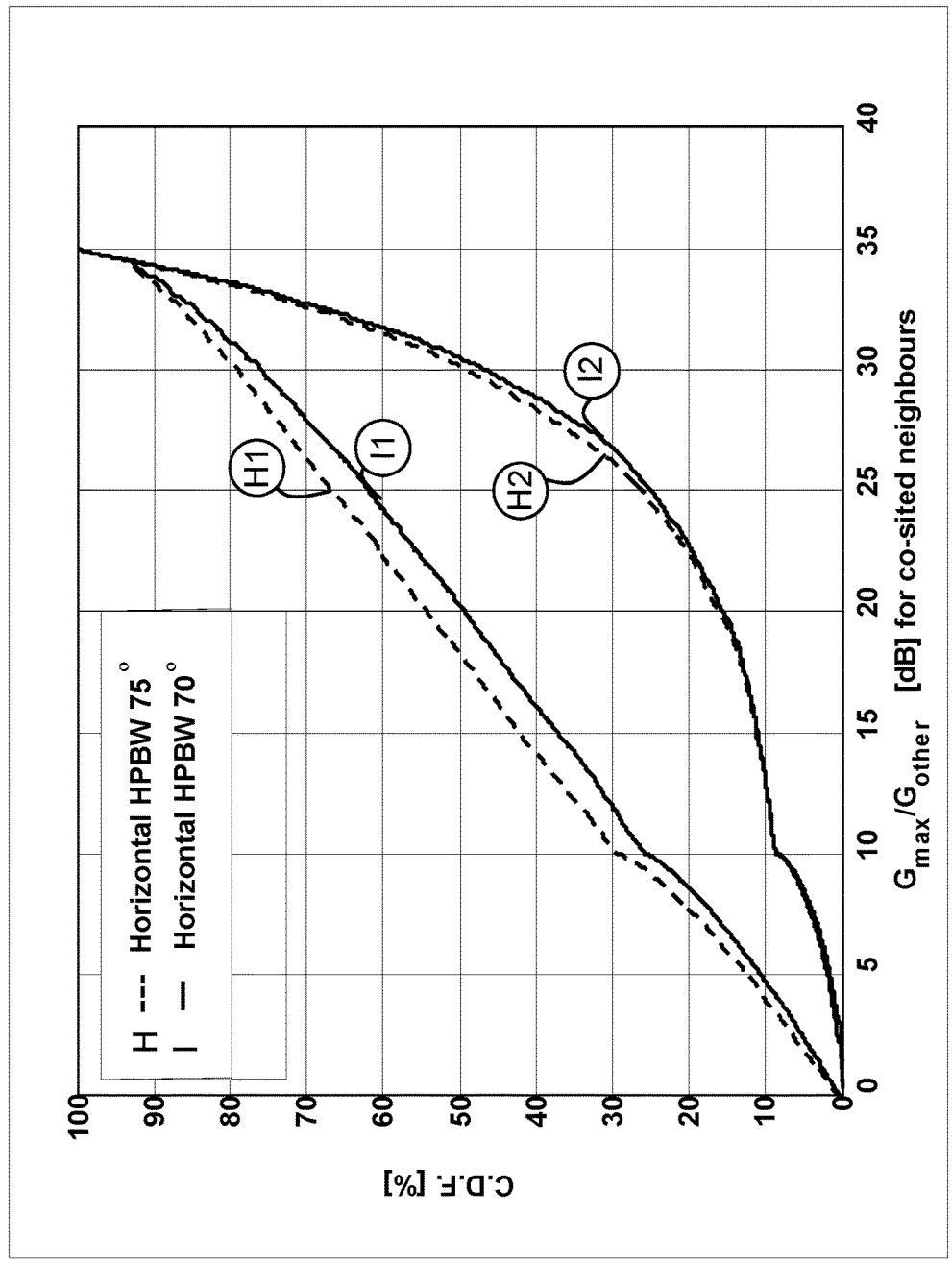
FIG. 4 is another diagram illustrating adjustments of antenna parameters according to some embodiments.

FIG. 4 is a diagram illustrating an example of an adjustment of an antenna parameter according to some embodiments.

In the diagram of FIG. 4, a cumulative distribution function, CDF—H1—representing the distribution of user equipments for a first cell relation for a connected cell is shown for different geometry factors G. The geometry factors are in FIG. 4 denoted $G_{max}/G_{other}$, and is the same geometry factors as described in Eq. 1 above. In this example, the antenna of the neighboring cell in this first cell relation is co-located with the antenna of the connected cell in a network node. The antenna of the neighboring cell in this first cell relation is serving a first neighbouring cell, e.g. cell 204 in the network node 102 in FIG. 1.

Also, in the diagram of FIG. 4, a cumulative distribution function, CDF—H2—representing the distribution of user equipments for a second cell relation for the connected cell is shown for different geometry factors G. In this example, the antenna of the neighboring cell in this second cell relation is also co-located with the antenna of the connected cell in the network node, and is serving second neighbouring cell, e.g. cell 206 in the network node 102 in FIG. 1.

In this example, the antenna of the connected cell, e.g. the cell 205 in the network node 102 in FIG. 1, has a 75° degree horizontal beam width (HPBW). The dashed lines of the CDFs—H1 and H2—show the cell isolation of the first and second cell relations, respectively, prior to any antenna adjustments.

Furthermore, in the diagram of FIG. 4, a cumulative distribution function, CDF—I1—representing the distribution of user equipments of the first cell relation is shown for different geometry factors G, after the antenna of the connected cell has been adjusted in accordance with embodiments herein. In this case, the horizontal HPBW of the antenna of the connected cell has been adjusted to a 70° degree horizontal HPBW. As can be seen by the fully drawn line of the CDF—I1—the cell isolation of the first cell relation, i.e. the strongest interfering neighbour, has been increased by approximately 1-2 dB. This results in a better fit for the antenna of the connected cell in relation to the antenna of its strongest interfering neighbour. Further advantages of this better fit are improved channel estimation in the cell, improved coding and modulation, higher possible bit rates, etc.

Further, in the diagram of FIG. 4, a cumulative distribution function, CDF—I2—representing the distribution of user equipments of the second cell relation is shown for different geometry factors G, after the antenna of the connected cell has been adjusted in accordance with embodiments herein. As can be seen by the fully drawn line of the CDF—I2—the cell isolation of the second cell relation, i.e. not the strongest interfering neighbour, is not substantially affected by the antenna adjustment of the connected cell. Thus, the antenna of the connected cell in relation to the antenna of its other interfering neighbour is not substantially affected.

Figure 5:
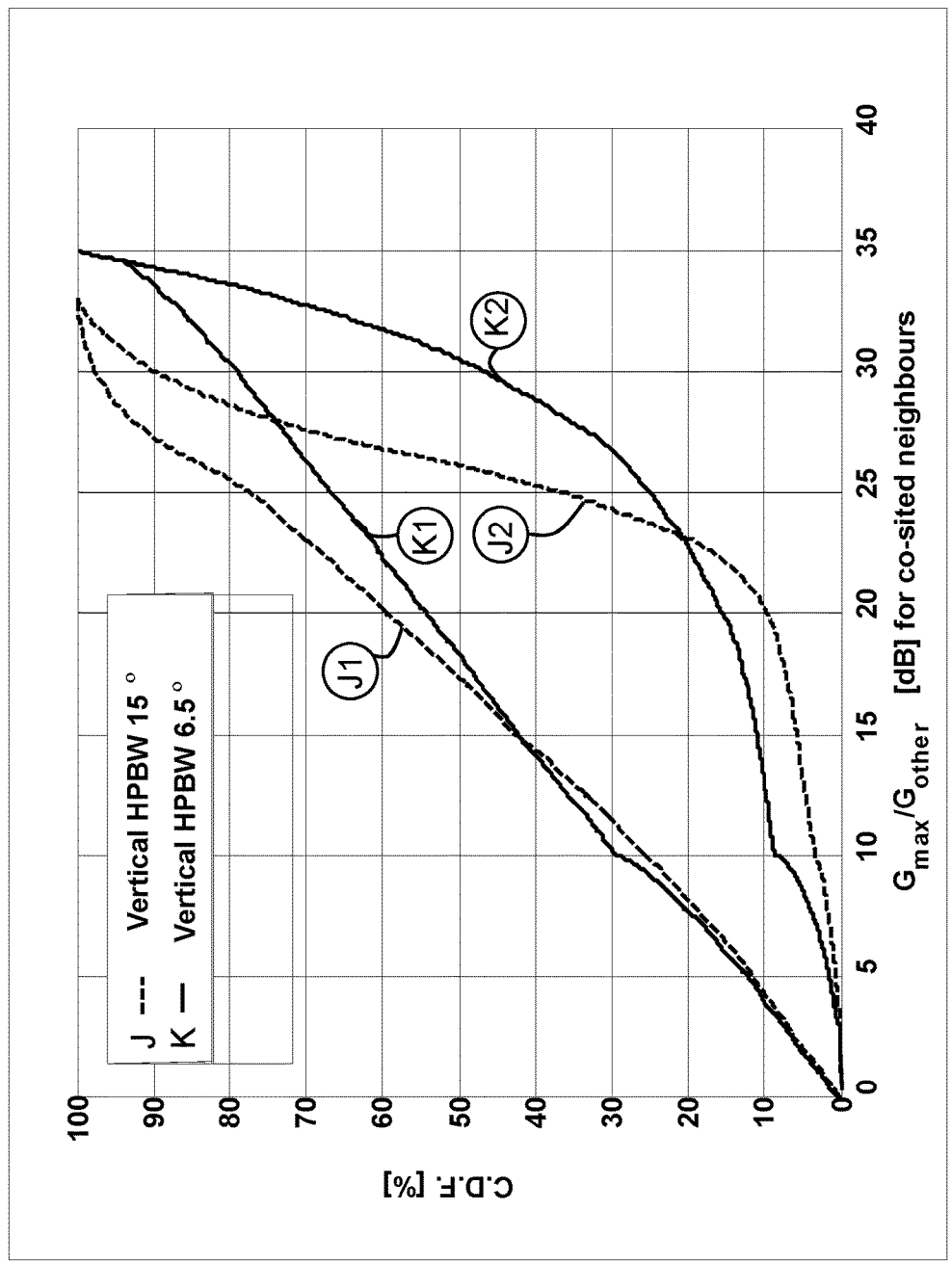
FIG. 5 is a further diagram illustrating adjustments of antenna parameters according to some embodiments.

FIG. 5 is a further diagram illustrating an example of an adjustment of an antenna parameter according to some embodiments.

In the diagram of FIG. 5, a cumulative distribution function, CDF—J1—representing the distribution of user equipments for a first cell relation for a connected cell is shown for different geometry factors G. In this example, the antenna of the neighboring cell in this first cell relation is co-located with the antenna of the connected cell in a network node, and is serving a first neighbouring cell, e.g. cell 204 in the network node 102 in FIG. 1.

Also, in the diagram of FIG. 5, a cumulative distribution function, CDF—J2—representing the distribution of user equipments for a second cell relation for the connected cell is shown for different geometry factors G. In this example, the antenna of the neighboring cell in this second cell relation is also co-located with the antenna of the connected cell in the network node, and serving second neighbouring cells, e.g. cell 206 in the network node 102 in FIG. 1.

In this example, the antenna of the connected cell, e.g. the cell 205 in the network node 102 in FIG. 1, has a 15° degree vertical beam width (HPBW). The dashed lines of the CDFs—J1 and J2—show the cell isolation of the first and second cell relations, respectively, prior to any antenna adjustments.

Furthermore, in the diagram of FIG. 5, a cumulative distribution function, CDF—K1—representing the distribution of user equipments of the first cell relation is shown for different geometry factors G, after the antenna of the connected cell has been adjusted in accordance with embodiments herein. In this case, the vertical HPBW of the antenna of the connected cell has been adjusted to a 6.5° degree vertical HPBW. As can be seen by the fully drawn line of the CDF—K1—the cell isolation of the first cell relation, i.e. the strongest interfering neighbour, has been increased by approximately 5 dB for high percentiles.

Further, in the diagram of FIG. 5, a cumulative distribution function, CDF—K2—representing the distribution of user equipments of the second cell relation is also shown for different geometry factors G, after the antenna of the connected cell has been adjusted in accordance with embodiments herein. As can be seen by the fully drawn line of the CDF—K2—the cell isolation of the second cell relation, i.e. not the strongest interfering neighbour, has been increased by approximately 5 dB for high percentiles. This is because with a wide vertical HPBW, the interference caused to co-sited cells through the back and side lobes of the antenna are higher.

Thus, this will results in an overall better fit for the antenna of the connected cell in relation to both the antenna of its strongest interfering neighbour and the other interfering neighbour. Further advantages of this better fit are improved channel estimation in the cell, improved coding and modulation, higher possible bit rates, etc.

Figure 6:
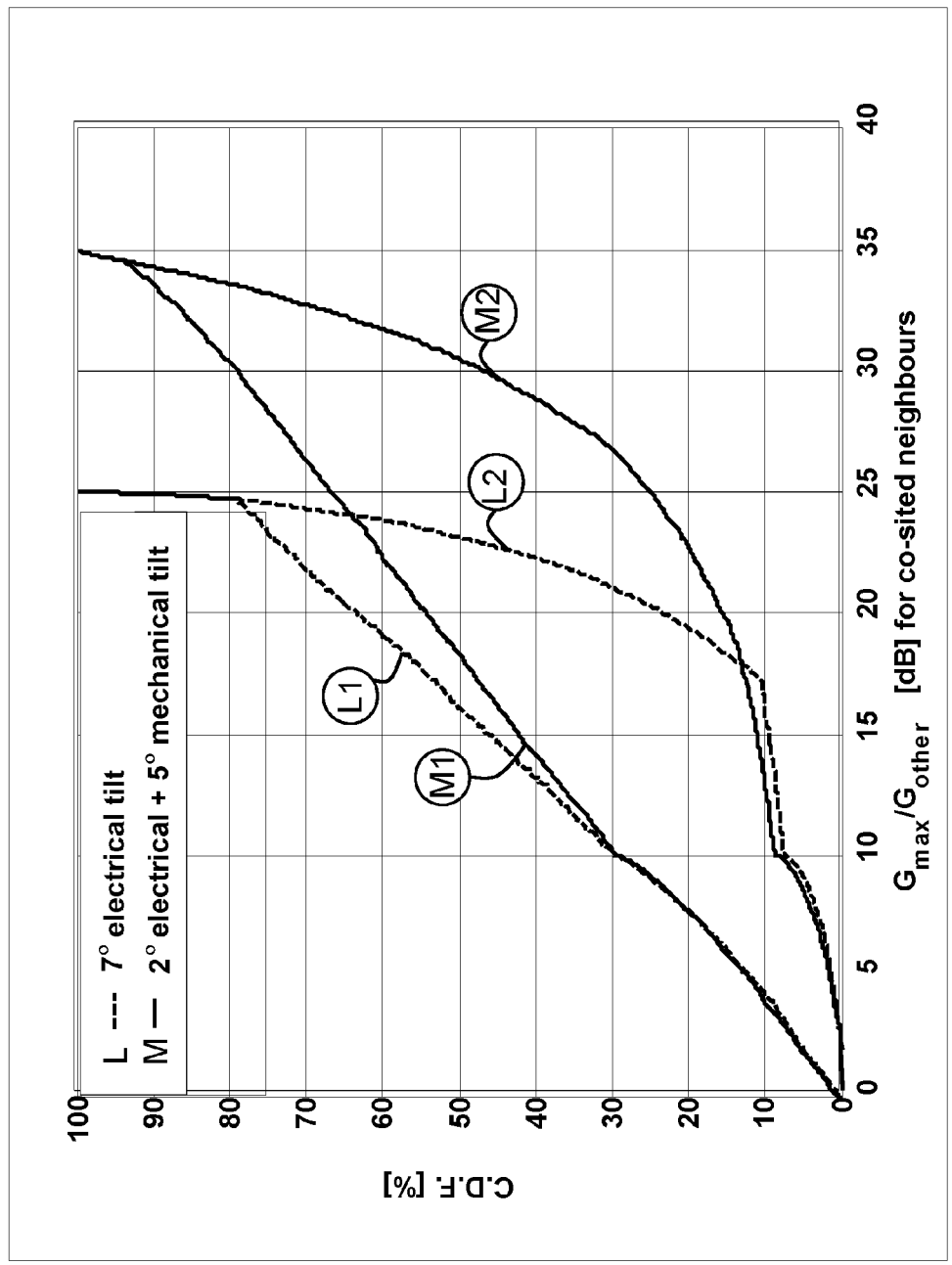
FIG. 6 is yet a further diagram illustrating adjustments of antenna parameters according to some embodiments.

FIG. 6 is a yet further diagram illustrating an example of an adjustment of an antenna parameter according to some embodiments.

In the diagram of FIG. 6, a cumulative distribution function, CDF—L1—representing the distribution of user equipments for a first cell relation for a connected cell is shown for different geometry factors G. In this example, the antenna of the neighboring cell in this first cell relation is co-located with the antenna of the connected cell in a network node, and is serving a first neighbouring cell, e.g. cell 204 in the network node 102 in FIG. 1.

Also, in the diagram of FIG. 6, a cumulative distribution function, CDF—L2—representing the distribution of user equipments for a second cell relation for the connected cell is shown for different geometry factors G. In this example, the antenna of the neighboring cell in this second cell relation is also co-located with the antenna of the connected cell in the network node, and serving second neighbouring cells, e.g. cell 206 in the network node 102 in FIG. 1.

In this example, the antenna of the connected cell, e.g. the cell 205 in the network node 102 in FIG. 1, has a 7° degree electrical tilt. The dashed lines of the CDFs—L1 and L2—show the cell isolation of the first and second cell relations, respectively, prior to any antenna adjustments.

Furthermore, in the diagram of FIG. 6, a cumulative distribution function, CDF—M1—representing the distribution of user equipments of the first cell relation is shown for different geometry factors G, after the antenna of the connected cell has been adjusted in accordance with embodiments herein. In this case, the electrical tilt of the antenna of the connected cell has been adjusted to a 2° electrical tilt, but an additional mechanical tilt of 5° has also been added. Electrical tilt may be achieved by adjusting the excitation of antenna elements resulting in that the highest gain is turned down in azimuth in all directions of the antenna, i.e. front, side and back lobe. Remote electrical tilt is a common feature available for many antennas with an electro-mechanical turning of the excitation phase of the antenna elements. Mechanical tilt may be achieved by turning the whole antenna in elevation. This results in that the front lobe is turned down and the back lobe is turned up. Remote mechanical tilt is also available, e.g. as an electromechanical equipment fitting to any antenna. Corresponding adjusted coverage by these antenna adjustments for both electrical and mechanical tilt may also be achieved in a solid state reconfigurable antenna by adjusting phase difference to antenna elements. As can be seen by the fully drawn line of the CDF—M1—the cell isolation of the first cell relation, i.e. the strongest interfering neighbour, has been increased for higher percentiles.

Further, in the diagram of FIG. 6, a cumulative distribution function, CDF—M2—representing the distribution of user equipments of the second cell relation is also shown for different geometry factors G, after the antenna of the connected cell has been adjusted in accordance with embodiments herein. As can be seen by the fully drawn line of the CDF—M2—the cell isolation of the second cell relation, i.e. not the strongest interfering neighbour, has been increased for high percentiles. This is because, when only electrical tilt is used, the co-sited cell isolation is limited by the Front-to-Back Ratio, FBR.

Thus, this will result in an overall better fit for the antenna of the connected cell in relation to both the antenna of its strongest interfering neighbour and the other interfering neighbour. Further advantages of this better fit are improved channel estimation in the cell, improved coding and modulation, higher possible bit rates, etc.

Figure 7:
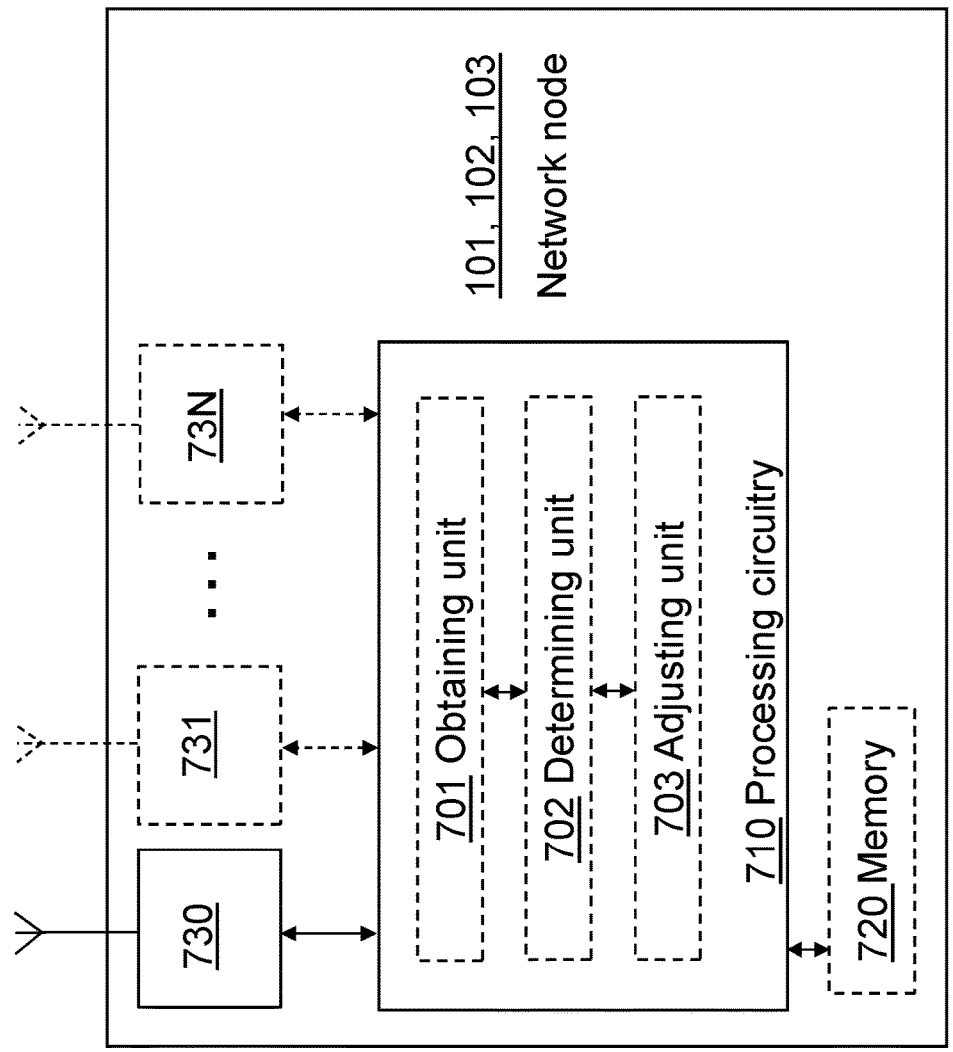
FIG. 7 is a block diagram depicting embodiments of a network node.

To perform the method actions in the network node 101, 102, 103 for adjusting antenna parameters of one or more antennas in a wireless telecommunications network 100, the network node 101, 102, 103 may comprise the following arrangement depicted in FIG. 7. FIG. 7 shows a schematic block diagram of embodiments of a network node 101, 102, 103.

The network node 101, 102, 103 comprises an obtaining unit 701, which may also be referred to as a collecting or obtaining device or circuitry. The obtaining unit 701 is configured to obtain signal strength values associated with the antennas for a number of user equipments in the wireless telecommunications network 100. In some embodiments, one antenna of the two antennas serves user equipments in a cell of the network node 101, 102, 103 and the other antenna of the two antennas serves user equipments in a neighboring cell of the same network node 101, 102, 103 or another network node in the wireless telecommunications network 100. In some embodiments, the signal strength values may be obtained by the network node 101, 102, 103 from user equipments served by the cell of the network node 101, 102, 103, respectively.

The network node 101, 102, 103 also comprises a determining unit 702, which may also be referred to as a determining device or circuitry. The determining unit 702 is configured to determine an amount of user equipments of the number of user equipments having a signal strength value difference from two antennas that passes a determined threshold for the signal strength value difference.

In some embodiments, the determined signal strength value difference threshold, i.e. the geometry factor G, is in the range of about 3-25 dB, and the determined threshold amount of user equipments, i.e. the percentile P, is in the range of about 5-60 percent of the number of user equipments.

The network node 101, 102, 103 further comprises an adjusting unit 702, which may also be referred to as an adjuster or an adjusting device or circuitry. The controlling unit 702 is configured to adjust at least one antenna parameter of at least one of the two antennas when the determined amount of user equipments passes a determined threshold for the amount of user equipments. In some embodiments, the at least one antenna parameter is one or more of: the tilt angle of the antenna, the beam width of the antenna, the direction of the antenna, and the null direction of the antenna.

In some embodiments, the determining unit 701 may be configured to adjust the at least one antenna parameter for the one antenna of the two antennas serving user equipments in the cell of the network node 101, 102, 103, for the other antenna of the two antennas that serves user equipments in a neighboring cell of the same 101, 102, 103 or another network node, or for both of the two antennas jointly.

In some embodiments the determining unit 701 may send the adjusted antenna parameters, i.e. antenna configuration, to the at least one antenna, or to equipment connect to the at least one antenna, or another network node that is positioned at a location closer to the at least one antenna in order to adjust the antenna accordingly. The antenna adjustment may be performed as mechanical movements of antenna elements of the at least one antenna or control of phases sent to antenna elements of the at least one antenna.

In some embodiments, the determining unit 701 may be configured to adjust the at least one antenna parameter dependent upon whether the two antennas are positioned at different locations, e.g. located at different network nodes, serving different neighboring cells or co-located at the same network node serving different neighboring cells. In some embodiments, when the two antennas are positioned co-located, e.g. at the same network node, serving different neighboring cells, the at least one antenna parameter is one or more of: the beam width of the antenna, and the direction of the antenna. In some embodiments, when the two antennas are positioned at different locations serving different neighboring cells, the at least one antenna parameter is one or more of: the tilt angle of the antenna, and the null direction of the antenna.

In some embodiments, the determining unit 701 may be configured to adjust the at least one antenna parameter in dependent upon one or more additional measurements, wherein the additional measurements is one of: drop rate measurements of user equipments, and Reference Signal Received Power, RSRP, measurements.

Furthermore, the network node 101, 102, 103 may also comprise one or more antennas 730, 731, . . . , 73N, wherein in N is an integer equal to or larger than two, i.e. N≤2. The one or more antennas 730, 731, . . . , 73N, may be used for transmitting data information to the served user equipments in the cells for which the one or more antennas 730, 731, . . . , 73N, are providing radio coverage.

The network node 101, 102, 103 may comprise a processing circuitry 710, which may also be referred to as a processor or a processing unit. The processing circuitry 710 may comprise the obtaining unit 701, the determining unit 702 and the adjusting unit 703.

The embodiments for adjusting antenna parameters of one or more antennas in a wireless telecommunications network 100 may be implemented through one or more processors, such as the processing circuitry 710 in the network node 101, 102, 103 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 710 in the network node 101, 102, 103. The computer program code may e.g. be provided as pure program code in the network node 101, 102, 103 or on a server and downloaded to the network node 101, 102, 103.

The network node 101, 102, 103 may further comprise a memory 720 comprising one or more memory units. The memory 720 may be arranged to be used to store data, such as, e.g. the geometry factors G and the percentiles P, to perform the methods herein when being executed in the network node 101, 102, 103.

Those skilled in the art will also appreciate that the processing circuitry 710 and the memory 720 described above may refer to a combination of analog and digital circuits, and/or one or more processors configured with software and/or firmware, e.g. stored in a memory, that when executed by the one or more processors such as the processing circuitry 710 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The terminology used in the detailed description of the particular exemplary embodiments illustrated in the accompanying drawings is not intended to be limiting of the described network node 101, 102, 103 and method, which instead are limited by the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a network node for adjusting antenna parameters of one or more antennas in a wireless telecommunications network, the method comprising
    obtaining signal strength values associated with the antennas for a number of user equipments in the wireless telecommunications network;
    determining an amount of user equipments of the number of user equipments (121) having a signal strength value difference from two antennas that passes a determined threshold for the signal strength value difference; and
    adjusting at least one antenna parameter of at least one of the two antennas when the determined amount of user equipments passes a determined threshold for the amount of user equipments.

2. The method according to claim 1, wherein one antenna of the two antennas serves user equipments in a cell of one network node, and the other antenna of the two antennas serves user equipments in a neighboring cell of the same or another network node in the wireless telecommunications network.

3. The method according to claim 2, wherein the signal strength values are obtained for user equipments served by the cell of the one network node.

4. The method according to claim 2, wherein the at least one antenna parameter is adjusted for the one antenna of the two antennas serving user equipments in the cell of the one network node, for the other antenna of the two antennas serves user equipments in a neighboring cell of the same or another network node, or for both of the two antennas jointly.

5. The method according to claim 1, wherein the determined signal strength value difference threshold is in the range of about 3-25 dB, and the determined threshold amount of user equipments is in the range of about 5-60 percent of the number of user equipments.

6. The method according to claim 1, wherein the at least one antenna parameter is one or more of: the tilt angle of the antenna, the beam width of the antenna, the direction of the antenna, and the null direction of the antenna.

7. The method according to claim 1, wherein the at least one antenna parameter is adjusted dependent upon whether the two antennas are positioned at different locations serving different neighboring cells or positioned co-located serving different neighboring cells.

8. The method according to claim 7, wherein, when the two antennas are positioned co-located serving different neighboring cells, the at least one antenna parameter is one or more of: the beam width of the antenna, and the direction of the antenna.

9. The method according to claim 7, wherein, when the two antennas are positioned at different locations serving different neighboring cells, the at least one antenna parameter is one or more of: the tilt angle of the antenna, and the null direction of the antenna.

10. The method according to claim 1, wherein the adjusting is further performed using of one or more additional measurements, wherein the additional measurements is one of: drop rate measurements of user equipments, and Reference Signal Received Power, RSRP, measurements.

11. The method according to claim 1, wherein the network node determines the at least one antenna parameter that is to be adjusted based on signal strength value differences of the number of user equipments.

12. A network node for adjusting antenna parameters of one or more antennas in a wireless telecommunications network, the network node comprising
    processing circuitry configured to obtain signal strength values associated with the antennas for a number of user equipments in the wireless telecommunications network, determine an amount of user equipments of the number of user equipments having a signal strength value difference from two antennas that passes a determined threshold for the signal strength value difference, and adjust at least one antenna parameter of at least one of the two antennas when the determined amount of user equipments passes a determined threshold for the amount of user equipments.

13. The network node according to claim 12, wherein one antenna of the two antennas serves user equipments in a cell of the network node, and the other antenna of the two antennas serves user equipments in a neighboring cell of the same or another network node in the wireless telecommunications network.

14. The network node according to claim 13, wherein the processing circuitry is configured to obtain the signal strength values from user equipments served by the cell of the network node.

15. The network node according to claim 13, wherein the processing circuitry is configured to adjust the at least one antenna parameter for the one antenna of the two antennas serving user equipments in the cell of the network node, for the other antenna of the two antennas serves user equipments in a neighboring cell of the same or another network node, or for both of the two antennas jointly.

16. The network node according to claim 12, wherein the determined signal strength value difference threshold is in the range of about 3-25 dB, and the determined threshold amount of user equipments is in the range of about 5-60 percent of the number of user equipments.

17. The network node according to claim 12, wherein the at least one antenna parameter is one or more of: the tilt angle of the antenna, the beam width of the antenna, the direction of the antenna, and the null direction of the antenna.

18. The network node according to claim 12, wherein the processing circuitry is configured to adjust the at least one antenna parameter dependent upon whether the two antennas are positioned at different locations serving different neighboring cells or positioned co-located at the same network node serving different neighboring cells.

19. The network node according to claim 18, wherein, when the two antennas are positioned co-located serving different neighboring cells, the at least one antenna parameter is one or more of: the beam width of the antenna, and the direction of the antenna.

20. The network node according to claim 18, wherein, when the two antennas are positioned at different locations serving different neighboring cells, the at least one antenna parameter is one or more of: the tilt angle of the antenna, and the null direction of the antenna.

21. The network node according to claim 12, wherein the processing circuitry is configured to adjust the at least one antenna parameter in dependent upon one or more additional measurements, wherein the additional measurements is one of: drop rate measurements of user equipments, and Reference Signal Received Power, RSRP, measurements.

22. The network node according to claim 12, wherein the processing circuitry is configured to determine the at least one antenna parameter that is to be adjusted based on signal strength value differences of the number of user equipments.

* * * * *